(12) United States Patent
Elser

(10) Patent No.: US 6,328,323 B1
(45) Date of Patent: Dec. 11, 2001

(54) ACTUATOR

(75) Inventor: Dieter Elser, Essingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/422,520

(22) Filed: Oct. 21, 1999

(30) Foreign Application Priority Data

Dec. 1, 1998 (DE) .............................................. 198 55 343

(51) Int. Cl.$^7$ ....................................................... B60G 3/02
(52) U.S. Cl. ........................ 280/124.152; 280/124.107; 280/124.137; 280/124.149; 188/188
(58) Field of Search ................... 280/124.152, 124.137, 280/124.149, 124.106, 124.107; 464/97; 188/188, 187; 267/226, 277

(56) References Cited

U.S. PATENT DOCUMENTS

| | | | |
|---|---|---|---|
| 2,356,598 | | 8/1944 | Lang et al. ........................... 121/33 |
| 3,572,744 | * | 3/1971 | Smith ..................................... 280/90 |
| 3,679,032 | | 7/1972 | Bennett ................................. 192/46 |
| 4,919,444 | | 4/1990 | Leiber et al. . |
| 4,962,943 | * | 10/1990 | Lin ....................................... 280/707 |
| 5,141,088 | | 8/1992 | Kurihara et al. . |
| 5,217,245 | * | 6/1993 | Guy ..................................... 280/689 |
| 5,251,926 | * | 10/1993 | Aulerich et al. ...................... 280/665 |
| 5,362,094 | * | 11/1994 | Jensen ................................. 280/689 |
| 5,480,186 | * | 1/1996 | Smith .................................. 280/772 |
| 5,529,324 | | 6/1996 | Krawczyk et al. . |
| 5,549,328 | | 8/1996 | Cubalchini . |
| 5,601,165 | * | 2/1997 | Oppitz et al. ........................ 188/296 |
| 6,003,880 | * | 12/1999 | Kokotovic .......................... 280/5.506 |
| 6,022,030 | * | 2/2000 | Fehring .............................. 280/5.511 |
| 6,149,166 | * | 11/2000 | Struss et al. ....................... 280/5.511 |

FOREIGN PATENT DOCUMENTS

| | | |
|---|---|---|
| 20 53 649 A | 5/1972 | (DE) . |
| 36 11 361 A | 10/1987 | (DE) . |
| 38 01 348 A1 | 8/1988 | (DE) . |
| 44 12 734 A1 | 3/1995 | (DE) . |
| 88/05875 A1 | 8/1988 | (EP) . |
| 0 344 183 B1 | 12/1989 | (EP) . |
| 0 761 411 | 11/1956 | (GB) . |
| 1 277 155 | 6/1972 | (GB) . |
| 2 212 770 A | 8/1989 | (GB) . |
| 2 220 625 A | 1/1990 | (GB) . |
| 357144315-A | * 9/1982 | (JP) ...................................... 192/86 |
| 357206701-A | * 12/1982 | (JP) ..................................... 417/437 |
| 62 221909 A | 9/1987 | (JP) . |

OTHER PUBLICATIONS

Japanese Abstract, No. 57–144315 A, M–176 dated Dec. 4, 1982, vol. 6, No. 246.

* cited by examiner

*Primary Examiner*—Brian L. Johnson
*Assistant Examiner*—Daniel Yeagley
(74) *Attorney, Agent, or Firm*—Davis & Bujold, P.L.L.C.

(57) ABSTRACT

Actuator having at least two coupling parts (4, 5) which are connected with a stabilizer (2, 13) and have coupling splines (10, 11) wherein one coupling part (5) is axially movable and prestressed by a spring (9) while the other coupling part (4) is firmly connected with a housing (1), and a pressure chamber (8) is between the coupling splines (10, 11), the inner pressure of which regulates the disengagement process.

14 Claims, 3 Drawing Sheets

ACTUATOR

BACKGROUND OF THE INVENTION

Figure 1:
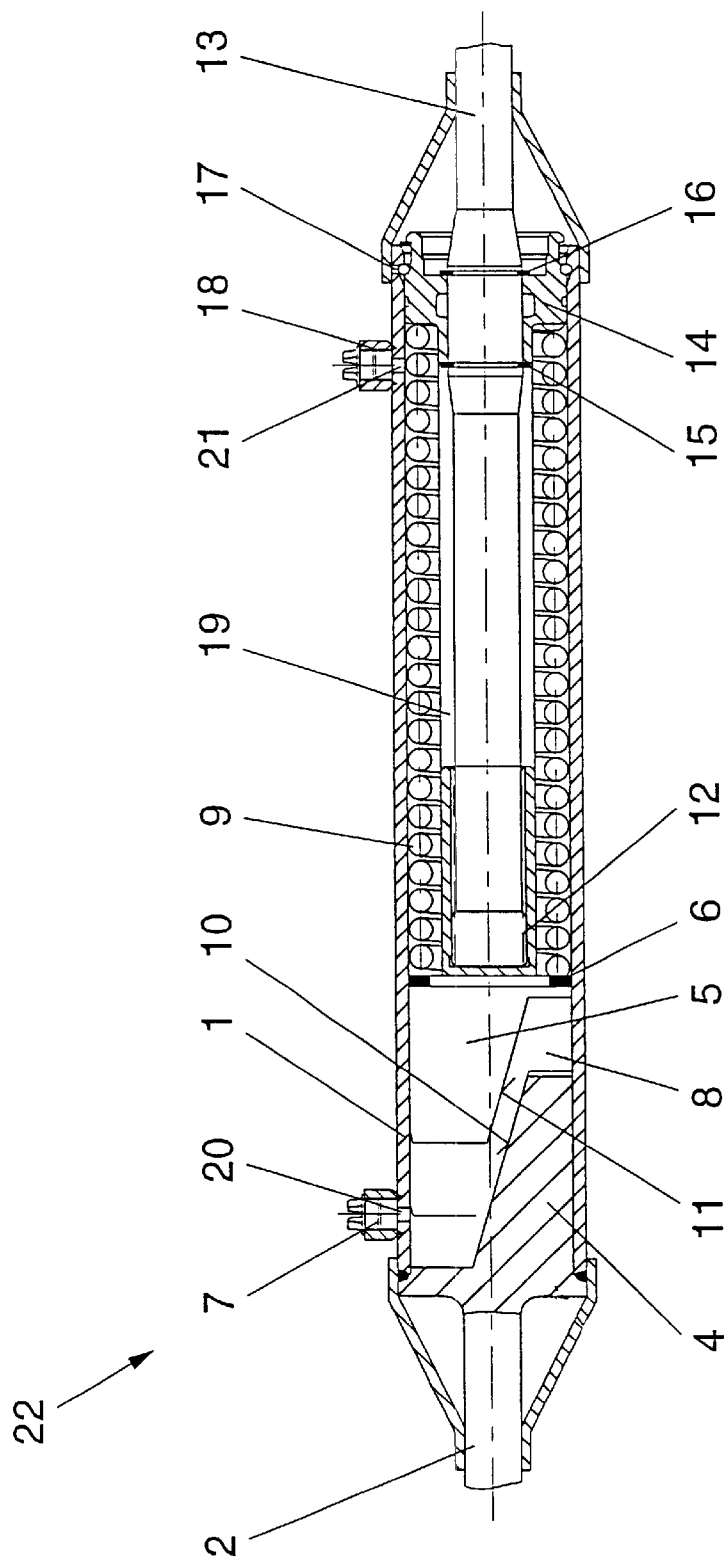

The invention concerns an actuator.

In EP 344 183 B1 has been described an actuator in the form of a locking shaft coupling in which a quick engagement and disengagement of two shaft parts is made possible by the fact that at least one of the two coupling halves is equipped with drivers which mesh in recesses of the other clutch half or of a part connected therewith and the relative position of the drivers is changeable to two shift positions so that different angles of rotation can be set between the shaft parts to be coupled. The coupling halves have distributed on the periphery drivers in the form of drag bolts carrying rollers. The latter mesh in recesses designed as guide grooves of a coupling sleeve.

In the prior art such as described in EP 344 183 B1, the fact that because of the constructional principle with the drivers distributed on the periphery a large radial installation space is required has a disadvantageous effect which above all limits the ground clearance in off road vehicles and the multiplicity of small parts creates a high susceptibility to dirt capable of impairing the operation.

This invention is based on the problem of designing an actuator, which by virtue of its small radial extension, does not limit the ground clearance of vehicles.

SUMMARY OF THE INVENTION

As result of the compact design mainly in radial direction and the reduced number of parts susceptible to interference and dirt, the actuator according to the invention is particularly suited to installation in vehicles used in difficult terrains. By integrating drag and prestressed springs in a housing, installation space and multiplicity of parts are reduced.

BRIEF DESCRIPTION OF THE DRAWING(S)

Figure 2:
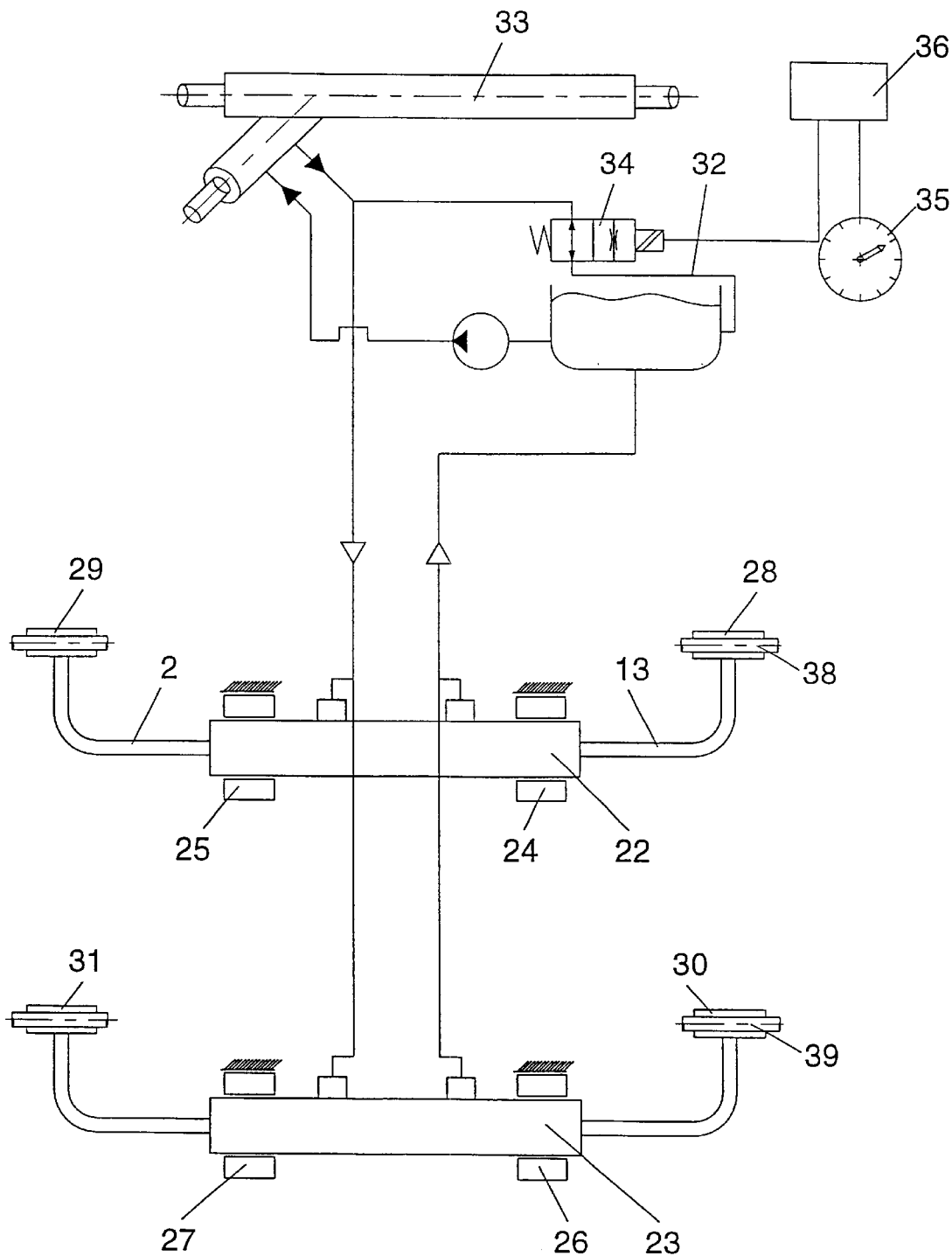
Figure 3:
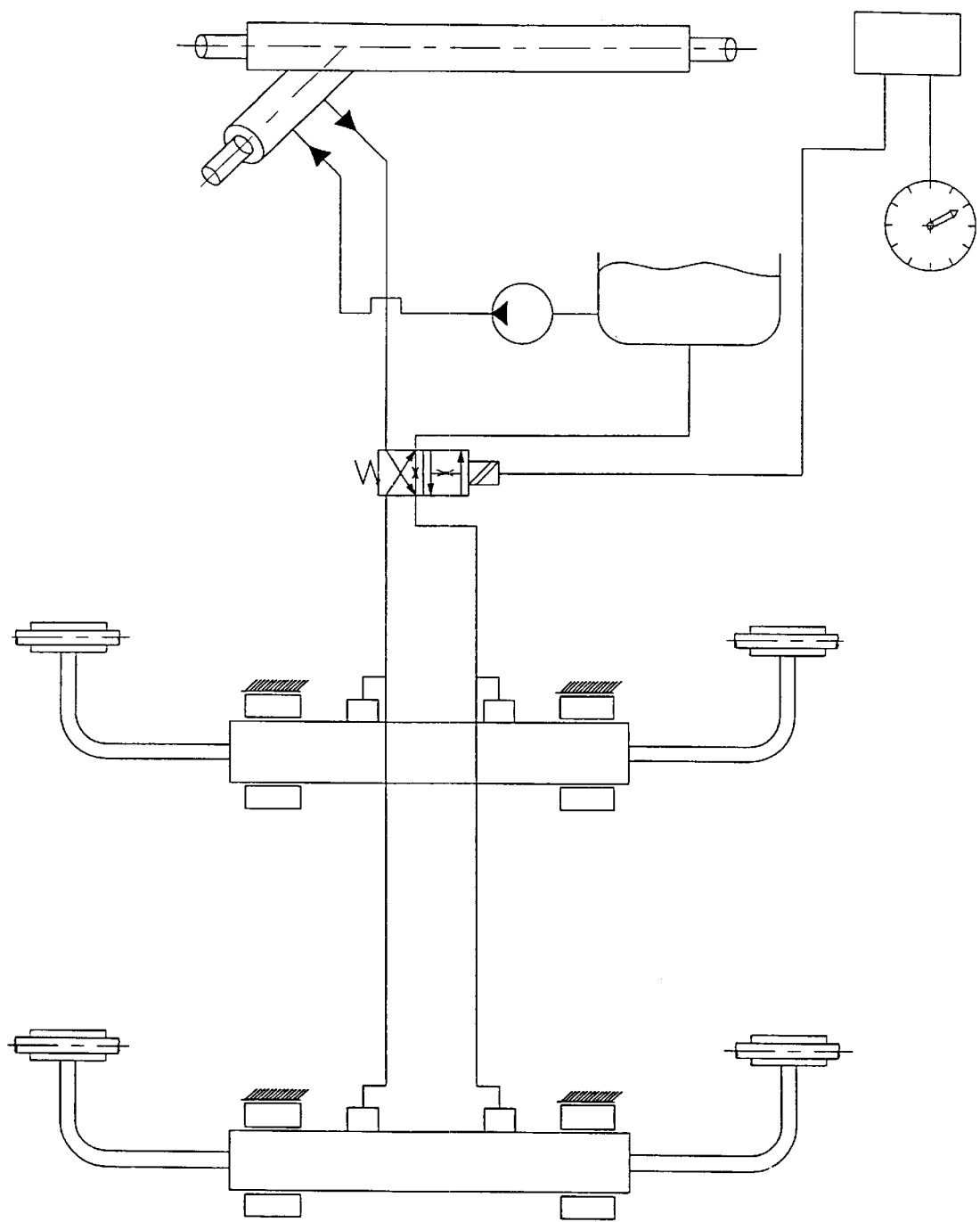

Different embodiments of this invention are fundamentally described herebelow with the aid of drawings where:

FIG. 1 is a constructional embodiment of an actuator according to the invention; and FIGS. 2 and 3 are examples of utilization of an actuator according to the invention.

DESCRIPTION OF THE PREFERRED EMBODIMENT(S)

In FIG. 1 is shown the constructional assembly of an actuator according to the invention. A housing 1 is firmly connected with a stabilizer 2. A cover is firmly connected with a stabilizer 2 and the housing 1 acts as first coupling part 4 which has a coupling spline 10. A second coupling part 5 is movably mounted in the housing 1 and provided with a seal 6 which encloses in one pressure chamber 8 for actuation pressure introduced by a connection 7. The coupling part 5 is biased by a spring 9 against the pressure acting in the pressure chamber 8, i.e. a disengagement operation occurs when the pressure force is increased. In case of a low pressure but elevated spring tension, an engagement takes place.

In FIG. 1 is shown a disengaged situation. The coupling splines 10 and 11 are here separated from each other to the extent that the coupling part 5, which is axially movable via a shaft spline 12, and radially fixed with a stabilizer 13, allows a rotation between the stabilizer 2 and the stabilizer 13 without torsional stress occurring at the same time. The stabilizer 13 is supported in the area of the shaft spline 12 and in a guide part 14, sealed, and axially fixed with fastening means 15, 16 and 17, such as snap rings or locking rings. The guide part 14 serves at the same time as sealing carrier for sealing relative to the housing 1 and, via a fastening means 16, for reinforcing the spring tension, relative to the housing 1. A connection 18 placed in the housing 1 serves to restore potential leakage of the sealing 6 and to fill a low-pressure chamber 19. In an operational variation, said low-pressure chamber 19 is also energized with back pressure for reinforcing the spring tension. The connections 7 and 18 communicate, via respective holes 20 and 21, in the housing 1 with the pressure chamber 8 and the low-pressure chamber 19. By reducing the diameter of the holes 20 and 21, a hydraulic damping can also be produced by the actuator 22 according to the invention. The coupling parts 4 and 5 axially overlap always in the disengaged state so that the stabilizers 2 and 13 are automatically engaged in case of a drop of pressure.

FIG. 2 shows a utilization of the actuators 22 and 23 according to the invention with an accessory energy-supply and control system.

The actuators 22 and 23, according to the invention, are supported in rocking bearings 24, 25, 26 and 27 on the vehicle bottom, not shown, of a multiple-axle vehicle. On the outer ends of the equally constructed stabilizers 2 and 13, additional rocking bearings 28, 29, 30 and 31 are placed which fix the stabilizers 2 and 13 also axially on respective vehicle axles 38 and 39.

The pressure required for the disengagement process of the actuators 22 and 23 is produced by an electromagnetically actuatable control valve 34 installed in a return pipe 32 of a hydraulic steering system 33. The control valve 34 is actuated in the low speed range for the cases when the vehicle would effect great wobbling movements in difficult terrain via rigid stabilizers. The disengagement can speed-dependently result automatically by an electronic control 36, via a speed signal, delivered by a tachometer 35 or can be manually activated via a switch, not shown. For reasons of safety, however, the engagement must automatically result when a high transverse acceleration appears and depending on a speed limit.

The control valve 34 is advantageously shifted so that the power coupling on the actuators 22 and 23, i.e. the engagement of both coupling parts 4 and 5, takes place automatically in case of breakdown of the electric system. This is required in order to limit the wobbling angle at elevated speeds and transverse accelerations. Since the driving in difficult terrain at low speeds with disengaged actuators 22 and 23 constitutes a very small time portion in the utilization of the vehicle, it is especially advantageous for energy supply to use the oil hydraulic system of the steering system 33.

Shown in FIG. 3, the example of utilization stands out by an alternative control of the actuators 22 and 23 according to the invention. At very strong actuator forces, the hydraulics of the steering system is used to reinforce the spring 9 during the engagement process.

REFERENCE NUMERALS 1 housing
2 stabilizer
3 cover
4 coupling part 5 coupling part
6 sealing
7 connection
8 pressure chamber
9 spring
10 coupling profile
11 coupling profile
12 spline shaft
13 stabilizer
14 guide part
15 fastening means
16 fastening means
17 fastening means
18 connection
19 low-pressure chamber
20 hole
21 hole
22 actuator
23 actuator
24 rocking bearing
25 rocking bearing
26 rocking bearing
27 rocking bearing
28 rocking bearing
29 rocking bearing
30 rocking bearing
31 rocking bearing
32 return pipe
33 steering system
34 control valve
35 tachometer
36 electronic control
37 control valve

What is claimed is:

1. An actuator (22) for stabilization of wobbling in a motor vehicle comprising:
   an actuator housing supporting first and second opposed stabilizers;
   a first coupling part (4) being firmly connected with the housing (1) and a first stabilizer (2);
   a second coupling part (5) being connected with a second stabilizer (13), and a spring (9) biasing the second coupling part (5) toward the first coupling part (4), and the second coupling part (5) being axially movable relative to both the first coupling part (4) and the second stabilizer (13);
   the first and the second coupling parts (4, 5) having mating coupling profiles (10, 11) to facilitate mating engagement with one another;
   a pressure chamber (8) formed between the mating coupling profiles (10, 11) of the coupling parts (4, 5) so that when a sufficient pressure is generated within the pressure chamber (8), to overcome bias of the spring (9), the first and the second coupling parts (4,5) separate from one another to allow rotation between the first and the second stabilizers (2, 13) without torsional stress occurring during such separation of the first and the second coupling parts (4,5); and
   when the bias of the spring (9) overcomes the pressure in the pressure chamber (8), the mating coupling profiles (10,11) of the first and second coupling parts (4,5) are biased into engagement with one another.

2. The actuator (22) according to claim 1, wherein the coupling profiles (10, 11) of the first and the second coupling parts (4,5) are substantially planar surfaces which are inclined with respect to a central axis of the actuator (22).

3. The actuator according to claim 1, wherein the spring (9) exerts sufficient force so that, in an engaged state of the mating coupling profiles (10,11), the coupling profiles (10, 11) are prevented from becoming separated from one another when the actuator is subjected to a wobbling force.

4. The actuator according to claim 1, in combination with a vehicle axle (38 or 39) for stabilization of wobbling in the motor vehicle, the actuator (22 or 23) being supported by a pair of rocking bearings (24, 25 or 28, 29) connected with at least one vehicle axle (38 or 39), and the actuator (22 or 23) receives a control pressure from a control valve (34) coupled to a return pipe (32) of a hydraulic steering system (33), to facilitate separation of the mating coupling profiles (10,11) from one another.

5. The actuator according to claim 4, wherein a tachometer (35) is coupled to an electronic control (36) to supply a speed signal thereto, and the electronic control (36) automatically speed-dependently actuates the control valve (34) to facilitate one of engagement and separation of the mating coupling profiles (10,11) from one another.

6. The actuator according to claim 4, wherein the control valve is opened, when control pressure is supplied to the pressure chamber (8) via a hole (20) formed in the housing (1), and the control valve closes to facilitate engagement of the mating coupling profiles (10,11) with one another.

7. The actuator according to claim 4, wherein the control pressure from the control valve (34) actuates the actuator (22 or 23).

8. A pair of actuators (22) for stabilization of wobbling in a motor vehicle, each of the pair of actuators being connected to a separate vehicle axle by via first and second stabilizers and a pair of rocker bearings, each actuator comprising:
   an actuator housing supporting the first and the second opposed stabilizes;
   a first coupling part (4) being firmly connected with the housing (1) and the first stabilizer (2);
   a second coupling part (5) being connected with a second stabilizer (13), a spring (9) biasing the second coupling part (5) toward engagement with the first coupling part (4), and the second coupling part (5) being axially movable relative to both the first coupling part (4) and the second stabilizer (13);
   the first and the second coupling parts (4, 5) having mating coupling profiles (10, 11) to facilitate mating engagement with one another;
   a pressure chamber (8) formed between the mating coupling profiles (10, 11) of the coupling parts (4, 5) so that when a sufficient pressure is generated within the pressure chamber (8), to overcome a bias of the spring (9), the first and the second coupling parts (4,5) are separated from one another to allow a rotation between the first and the second stabilizers (2, 13) without torsional stress occurring between the separated first and the second coupling parts (4,5); and
   when the bias of the spring (9) overcomes the pressure in the pressure chamber (8), the spring (9) biases the mating coupling profiles (10,11) of the first and second coupling parts (4,5) into engagement with one another.

9. The pair of actuators (22 and 23) according to claim 8, wherein the coupling profiles (10, 11) of the first and the second coupling parts (4,5) are both substantially planar and are inclined with respect to a central axis of the actuator (22 or 23).

10. The pair of actuators (22 and 23) according to claim 8, wherein the spring (9) exerts sufficient force so that, in an engaged state of the mating coupling profiles (10,11), the coupling profiles (10, 11) are prevented from becoming separated from one another when the actuator is subjected to a wobbling force.

11. The pair of actuators (22 and 23) according to claim 8 in combination with a pair of vehicle axles (38 and 39) for stabilization of wobbling in a motor vehicle, each of the pair of the actuators (22 or 23) being supported by the pair of rocking bearings (24, 25 or 28, 29) connected with one of the vehicle axles (38 or 39), and each of the pair of actuators (22 and 23) receives a control pressure from a control valve (34) coupled to a return pipe (32) of a hydraulic steering system (33), to facilitate separation of the mating coupling profiles (10,11) from one another.

12. The pair of actuators (22 and 23) according to claim 11, wherein a tachometer (35) is coupled to an electronic control (36) to supply a speed signal thereto, and the electronic control (36) automatically speed-dependently actuates the control valve (34) to facilitate one of engagement and disengagement of the mating coupling profiles (10,11) from one another.

13. The pair of actuators (22 and 23) according to claim 11, wherein the control valve is opened, when control pressure is supplied to the pressure chamber (8) via a hole (20) formed in the housing (1), and the control valve is closed to facilitate engagement of the mating coupling profiles (10,11).

14. The pair of actuators according to claim 11, wherein the control pressure from the control valve (34) is used to actuate the actuator (22 or 23).

* * * * *